United States Patent Office 3,351,496
Patented Nov. 7, 1967

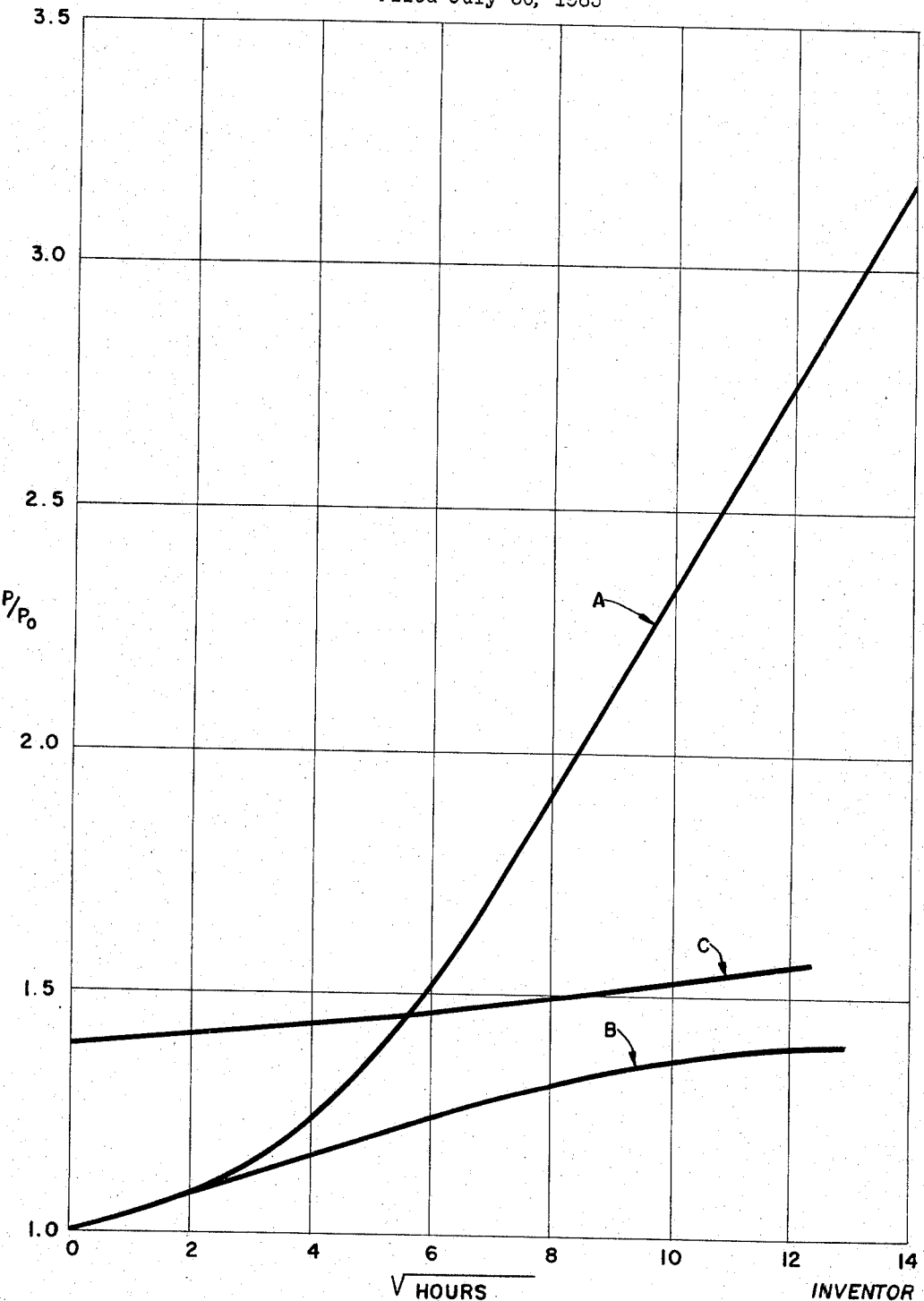

3,351,496
COMPOSITION OF MATTER AND METHOD
OF PRODUCING SAME
Ralph E. Carter, Colonie, N.Y., assignor to General
Electric Company, a corporation of New York
Filed July 30, 1965, Ser. No. 475,925
8 Claims. (Cl. 136—153)

This invention relates to a novel improved ionic conductive calcia stabilized zirconia solid electrolyte.

Heretofore, zirconia has been subjected to a variety of heat treatments to control the physical properties of this material, depending upon the ultimate use thereof.

It is an object of the present invention to obtain a stabilized zirconia that will have a minimum rate of increase of ion resistivity at the operating temperature of the zirconia, when used as a solid electrolyte in an electric cell.

Certain types of stabilized zirconia have heretofore been used as the electrolyte in solid electrolyte cells, but the increase in resistivity to the ion transfer has limited the life of these cells.

Zirconia is completely stabilized by the addition thereto of 10 to 20 mole percent calcia. 14.2 mole percent calcia is the preferred amount.

The ionic resistivity of calcia stabilized zirconia increases with time, the maximum rate of change occurring between 950° C. and 1000° C. The aging rate, however, is influenced by the thermal history of the zirconia which offers a means of controlling the resistivity change.

Zirconia stabilized with 14.2 mole percent calcia has a resistivity at time $t$, which is a multiple of that at time zero and is a function of the square root of time. The ratio of the resistivity at each individual time compared to the resistivity at time zero is plotted against the square root of time as shown in the graph.

In the present invention, all samples of calcia stabilized zirconia were subjected to a de-aging annealing treatment by heating to approximately 1400° C. for one hour, and are referred to as virgin calcia stabilized zirconia. While heating to a temperature of 1400° C. for one hour, is the preferred de-aging annealing treatment, any treatment above 1400° C. may be used, and a time shorter than one hour will produce virgin calcia stabilized zirconia.

It has been found that a subsequent annealing produces an improved product with a very low rate of resistivity increase. In this subsequent annealing, a temperature within the range of 1000° C. to 1300° C. is critical and the annealing period should be at least 30 hours. The preferred temperature is within the range of 1250° C. to 1260° C. and the preferred annealing period or heating time is 30 hours, but a higher temperature would require less time.

Referring to the graph, curve A shows the normal relationship found at 1000° C. for a polycrystalline sample which has been previously de-aged annealed at 1400° C. for approximately one hour. Curve B shows the relationship at 1250° C. for a similar polycrystalline sample previously annealed at 1400° C. for approximately one hour. Curve C shows the retarded rate at 1000° C. for a polycrystalline sample de-aged annealed at 1400° C. for approximately one hour followed by a further annealing at 1250° C. for 160 hours.

For the curves A, B and C, rho zero is the resistivity at time zero after the 1400° C. de-aging treatment.

In the case of each curve, rho is the measured resistivity at time $t$ measured from the beginning of that particular anneal.

A cell having a solid electrolyte therein has a useful life depending on the ionic resistivity increase of the solid electrolyte used therein.

Zirconia treated in accordance with this invention increases the effective life of such a cell many times, as shown by the resistivity time relationship shown in curves A and C.

The above annealing of calcia stabilized zirconia is applicable to single crystals or to a polycrystalline material which may be made by plasma spraying and sintering of calcia stabilized zirconia.

Having thus described this invention in such full, clear, concise and exact terms as to enable any person skilled in the art to which it pertains to make and use the same, I state that the subject matter which I regard as being my invention is particularly pointed out and distinctly claimed in what is claimed, it being understood that equivalents or modifications of, or substitutions for, parts of the specifically-described embodiments of the invention may be made without departing from the scope of the invention as set forth in what is claimed.

What I claim as new and desire to secure by Letters Patent of the United States is:

1. A method of heat treating completely stabilized zirconia to control the rate of ionic resistivity increase thereof, which comprises:
   (a) heating the completely stabilized zirconia above 1400° C. to produce virgin stabilized zirconia, and
   (b) reheating at 1100° C. to 1300° C. for at least 30 hours.

2. A method of heat treating completely stabilized zirconia to control the rate of ionic resistivity increase thereof, which comprises:
   (a) heating the calcia completely stabilized zirconia at 1400° C. for approximately one hour to produce virgin stabilized zirconia, and
   (b) reheating at 1250° C. to 1260° C. for at least 30 hours.

3. A method of heat treating a single crystal of completely stabilized zirconia to control the rate of ionic resistivity increase thereof, which comprises:
   (a) heating the single crystal of completely stabilized zirconia at 1400° C. for approximately one hour to produce virgin stabilized zirconia, and
   (b) reheating at 1250° C. for at least 30 hours.

4. A method of heat treating polycrystalline completely stabilized zirconia to control the rate of ionic resistivity increase thereof, which comprises:
   (a) heating the polycrystalline completely stabilized zirconia at 1400° C. for approximately one hour to produce virgin stabilized zirconia, and
   (b) reheating at 1260° C. for 160 hours.

5. A stabilized zirconia having a low ionic resistivity for use as a solid electrolyte in an electric cell, which comprises: zirconia stabilized with 10 to 20 mole percent of calcia and heat stabilized above 1400° C., and thereafter heat treated at 1100° C. to 1300° C. for 160 hours.

6. A stabilized zirconia having a low ionic resistivity for use as a solid electrolyte in an electric cell, which comprises: zirconia stabilized with 10 to 20 mole percent of calcia and heat stabilized above 1400° C., and thereafter heat treated at 1250° C. to 1260° C. for 160 hours.

7. A single crystal stabilized zirconia having a low ionic resistivity for use as a solid electrolyte in an electric cell, which comprises: zirconia stabilized with 10 to 20 mole percent of calcia and heat stabilized above 1400° C., and thereafter heat treated at 1250° C. for 160 hours.

8. A stabilized polycrystalline zirconia having a low ionic resistivity for use as a solid electrolyte in an electric cell, which comprises: zirconia stabilized with 10 to 20 mole percent of calcia and heat stabilized above 1400° C., and thereafter heat treated at 1260° C. for 160 hours.

References Cited

UNITED STATES PATENTS

| | | | |
|---|---|---|---|
| 2,910,371 | 10/1959 | Ryschkewitsch | 106—57 |
| 3,281,273 | 10/1966 | Oser | 136—86 |
| 3,300,344 | 1/1967 | Bray et al. | 136—86 |

ALLEN B. CURTIS, *Primary Examiner.*

WINSTON A. DOUGLAS, *Examiner.*

D. L. WALTON, *Assistant Examiner.*